US009251854B2

(12) United States Patent
Steiner

(10) Patent No.: US 9,251,854 B2
(45) Date of Patent: Feb. 2, 2016

(54) FACIAL DETECTION, RECOGNITION AND BOOKMARKING IN VIDEOS

(75) Inventor: Matthew S. Steiner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 339 days.

(21) Appl. No.: 13/219,820

(22) Filed: Aug. 29, 2011

(65) Prior Publication Data

US 2012/0213490 A1 Aug. 23, 2012

Related U.S. Application Data

(60) Provisional application No. 61/444,513, filed on Feb. 18, 2011.

(51) Int. Cl.
*H04N 5/76* (2006.01)
*G11B 27/28* (2006.01)
*H04N 5/85* (2006.01)
*G11B 27/10* (2006.01)
(Continued)

(52) U.S. Cl.
CPC .......... *G11B 27/28* (2013.01); *G06F 17/30793* (2013.01); *G06K 9/00677* (2013.01); *G11B 27/105* (2013.01); *G11B 27/3027* (2013.01); *H04N 5/85* (2013.01)

(58) Field of Classification Search
CPC ................................ H04N 5/85; G11B 27/105
USPC .......... 386/239, 241, 248; 382/103, 118, 213, 382/218, 305
See application file for complete search history.

(56) References Cited

U.S. PATENT DOCUMENTS

2007/0098303 A1* 5/2007 Gallagher et al. ............ 382/305
2008/0126191 A1 5/2008 Schiavi
(Continued)

FOREIGN PATENT DOCUMENTS

EP 1978524 A2 10/2008
EP 2031593 A1 3/2009
(Continued)

OTHER PUBLICATIONS

International Search Report, dated Jul. 5, 2013 for related PCT Application No. PCT/US2012/024920.
(Continued)

*Primary Examiner* — Thai Tran
*Assistant Examiner* — Mishawn Dunn
(74) *Attorney, Agent, or Firm* — IP Spring

(57) ABSTRACT

Methods, systems, and apparatus, including computer programs encoded on a computer storage medium, for facial bookmarking in videos. In one aspect, methods include receiving a digital video comprising video data, processing the video data to detect features indicative of a human face in the digital video, determining, from the video data, a first frame, in which the features indicative of the human face are detected in the digital video, determining first timestamp data corresponding to the first frame, determining, from the video data, a second frame, in which the features indicative of the human face are detected in the digital video, determining second timestamp data corresponding to the second frame, generating an identifier corresponding to the human face, generating a data set including the identifier, the first timestamp data and the second timestamp data, and appending the data set to the video data to provide annotated video data.

20 Claims, 5 Drawing Sheets

(51) Int. Cl.
*G06F 17/30* (2006.01)
*G11B 27/30* (2006.01)
*G06K 9/00* (2006.01)

(56) References Cited

U.S. PATENT DOCUMENTS

| | | | |
|---|---|---|---|
| 2009/0103887 A1* | 4/2009 | Choi et al. | 386/52 |
| 2009/0252383 A1 | 10/2009 | Adam et al. | |
| 2010/0014719 A1 | 1/2010 | Date et al. | |
| 2010/0046842 A1* | 2/2010 | Conwell | 382/218 |
| 2010/0104146 A1* | 4/2010 | Momosaki | 382/118 |
| 2010/0310134 A1 | 12/2010 | Kapoor et al. | |
| 2011/0060993 A1 | 3/2011 | Cotter | |
| 2012/0114307 A1 | 5/2012 | Yang | |
| 2012/0321281 A1 | 12/2012 | Hilem | |

FOREIGN PATENT DOCUMENTS

| | | | |
|---|---|---|---|
| GB | 2395853 A | 6/2004 | |
| WO | 0016243 A1 | 3/2000 | |
| WO | 2008147533 A1 | 12/2008 | |
| WO | 2010078553 A2 | 7/2010 | |
| WO | 2011/017653 A1 | 10/2011 | |

OTHER PUBLICATIONS

UK Office Action, dated Sep. 30, 2013 for related UK Application No. GB1314656.8.

Office Action, dated May 14, 2014, for related U.S. Appl. No. 13/344,168.

Final Office Action, dated Nov. 19, 2014, for related U.S. Appl. No. 13/344,168.

Office Action, dated May 8, 2014, for related U.S. Appl. No. 13/344,168.

Australia IP; Patent Examination Report 1 for AU patent application 20141110; dated Nov. 7, 2014; 3 pages.

United Kingdom Intellectual Property Office. Examination Report for Related United Kingdom Patent Application No. GB1314656.8. 4 pages. Jun. 8, 2015.

Erika Jonietz, "Augmented Identity", MIT Technology Review, v1.13.05.10, Feb. 23, 2010, http://www.technologyreview.com/news/417655/augmented-identity/.

United Kingdom Intellectual Property Office. Examination Report for Related United Kingdom Patent Application No. GB1314656.8, 5 pages, Sep. 11, 2015.

United Kingdom Intellectual Property Office. Examination Report for related United Kingdom Patent Application No. GB1314656.8. Oct. 20, 2015. 5 pages.

* cited by examiner

FACIAL DETECTION, RECOGNITION AND BOOKMARKING IN VIDEOS

CROSS-REFERENCE TO RELATED APPLICATIONS

This application claims the benefit of U.S. Prov. Pat. App. No. 61/444,513, filed Feb. 18, 2011, the disclosure of which is expressly incorporated herein by reference in its entirety.

TECHNICAL FIELD

This specification generally relates to digital videos.

BACKGROUND

The advent of high-quality consumer digital video cameras, as well as video cameras included in handheld devices, such as smart phones, has popularized home videos and movies more than ever before. People often take videos of events such as birthdays, graduations, as well as videos that tell stories or express ideas. Generally, the videos are made so that they can be published for viewing by a wide viewing audience. It has become easier to share videos using electronic file distribution and posting of videos, such as with websites that provide video content and avenues for users to provide video content. Social networking websites are also used to share videos with family and friends.

SUMMARY

In general, innovative aspects of the subject matter described in this specification may be embodied in methods that include actions of receiving a digital video including video data, processing the video data to detect features indicative of a human face in the digital video, determining, from the video data, a first frame, in which the features indicative of the human face are detected in the digital video, determining first timestamp data corresponding to the first frame, determining, from the video data, a second frame, in which the features indicative of the human face are detected in the digital video, determining second timestamp data corresponding to the second frame, generating an identifier corresponding to the human face, generating a data set comprising the identifier, the first timestamp data and the second timestamp data, and appending the data set to the video data to provide annotated video data.

These and other implementations may each optionally include one or more of the following features. For instance, actions further include: processing the video data to associate the features indicative of the human face to a particular person, and determining identity data associated with the particular person, wherein the identifier is generated based on the identity data; processing the video data to detect features indicative of a human face includes processing one or more frames of the digital video as an image, wherein each image is processed using facial detection techniques; actions further include displaying an annotated video based on the annotated video data, the annotated video including a bookmark corresponding to the data set; actions further include: receiving user input based on the bookmark, and advancing a presented frame in the digital video to the first frame in response to the user input; actions further include: comparing a first position of the features indicative of the human face in the first frame to a second position of features indicative of a second human face in the second frame, and determining, based on the first position and the second position, that the features indicative of the second human face correspond to the features indicative of the human face; actions further include: generating a facial model of the human face, and comparing the facial model to known facial models; generating the facial model of the human face includes generating a plurality of facial templates, each facial template corresponding to a frame in the video data in which the human face is detected, the facial model including the plurality of facial templates; each of the known facial models corresponds to a user of a social networking service; actions further include updating a known facial model based on one or more of a plurality of facial templates of the facial model; the known facial models are each generated after receiving the digital video; the known facial models are deleted from computer-readable memory after comparing; the known facial models are accessed from a persistent storage device that electronically stores a database of known facial models; comparing the facial models comprises comparing each facial template of the facial model to facial templates of each of the known facial models; actions further include: generating a confidence score between the facial model and a known facial model based on comparing the facial model to known facial models, comparing the confidence score to a threshold confidence score, and indicating that the facial model corresponds to the known facial model when the confidence score is greater than the threshold confidence score; actions further include: determining identity data corresponding to the known facial model, associating the facial model with the identity data, and appending the identity data to the data set; actions further include storing the facial model as a known facial model; and actions further include receiving user input, the user input indicating an identity corresponding to the human face, wherein the identifier corresponds to the identity.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
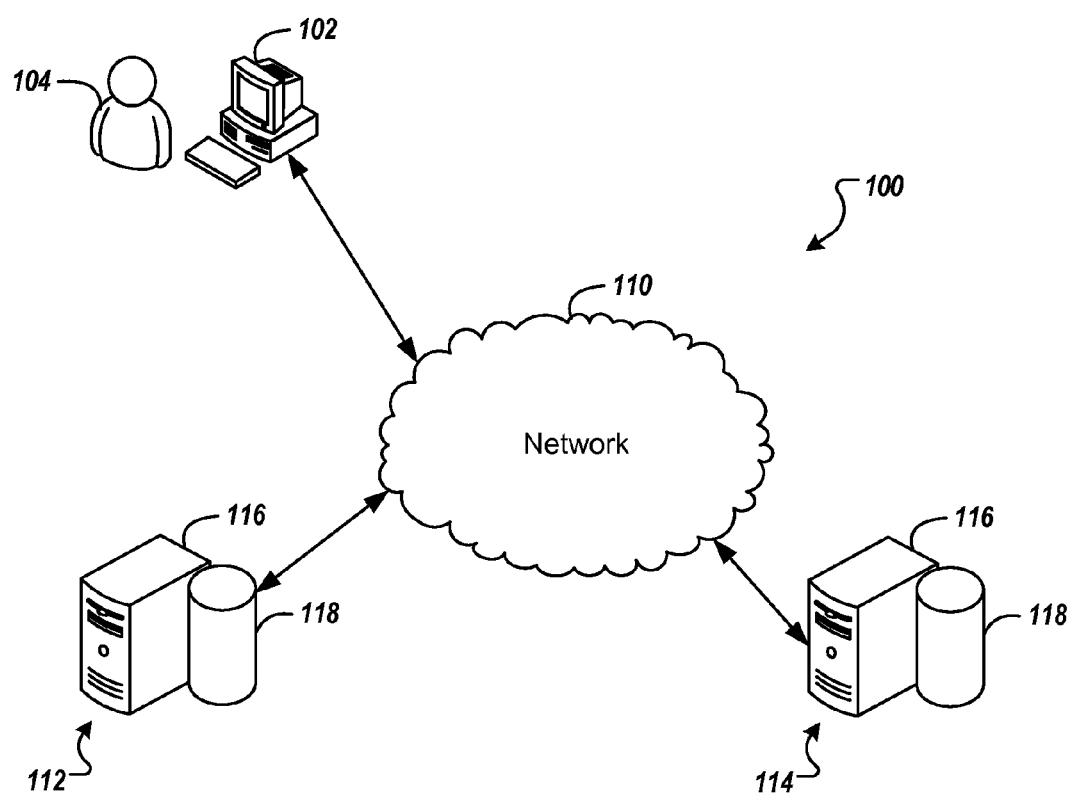
FIG. 1 depicts an example system architecture that can be used in accordance with implementations of the present disclosure.

This document describes systems and techniques for the automated detection of one or more persons in a digital video and bookmarking where each of the one or more persons enters and/or exits a video. Unlike photographs, the entire contents of a video is not presented in a static manner. Consequently, it is more difficult to label, or tag, a video with the identity of each person that appears in the video and to display the identity information. For example, an owner of a particular video would be required to view the entire video and identify each person appearing in the video. Although this may be practical for short videos having a minimal number of persons in the video, this task would be labor intensive and take significant time in long videos having numerous different persons.

In accordance with implementations of the present disclosure, a video processing system can process a digital video to detect and recognize people in the video. The video processing system can generate bookmarks (e.g., in the form of timestamps and positions in one or more frames) of where each particular person enters and/or exits the video. The video processing system can recognize faces in the video by processing one or more frames of the video with each frame being treated as a digital image. Each image can be processed using facial detection techniques to detect the presence of one or more faces within the image. In this manner, the video processing system can determine when a particular face, and thus a particular person, first appears in the video and when the particular face exits the video, as well as where (i.e., a position within one or more frames) that the particular face is displayed. Timestamps of the entrance and exit frames can be stored as bookmarks for each face detected in the video. The bookmarks can also include position. The video processing system can further process one or more frames of the video to recognize a detected face as being the face of a particular person (i.e., determining the identity of one or more persons appearing in the video). The identity of a particular person can be linked to the bookmarks to provide information regarding when the particular person enters and/or exits the video. The video processing system can generate metadata that is attached to, or otherwise provided with the computer-readable file corresponding to the video to provide an annotated video file. The metadata can include data indicating the identity of each of one or more persons present in the video, and bookmarks corresponding to when each of the one or more persons enters and/or exits the video.

The video processing system can provide the annotated video file for publishing to one or more websites. For example, the video processing system can process the video as discussed herein and then immediately publish an annotated video to a particular website based on instructions provided by the author of the video (e.g., a user that uploaded the video to the video processing system). As another example, the video processing system can generate the annotated video file based on instructions provided by the author of the video, and can provided the annotated video file back to the author for publishing of the video. However published, the annotated video can include tags corresponding to detected persons and/or recognized persons within the video and corresponding bookmarks. In some implementations, the annotated video can include controls corresponding to the bookmarks, such that, when clicked, the video can skip to a frame of the video, in which a detected person first appears and/or exits the video.

In some implementations, the video processing system can be associated with a social networking service. For example, an author of the video can be a user of the social networking service, and can be deemed to be an author user. The author user of the social networking service can upload the video for publication of the video using the social networking service. Faces detected in the video can be recognized based on people with whom the user is socially connected through the social networking service. For example, the video processing system can, with the user's permission and/or permission of other users to be recognized in the video, process images of the user's social connections when identifying people in the video, as discussed in further detail herein.

Generally, for situations in which the methods and systems discussed herein collect and/or access personal information about users, the users may be provided with an opportunity to opt in/out of programs or features that may collect and/or have access to personal information (e.g., information about a user's identity and/or preferences, information relating to the user's social graph, or a user's contributions to social content providers). In addition, certain data may be anonymized in one or more ways before it is stored, accessed or used, so that personally identifiable information is removed. For example, a user's identity may be anonymized so that identified user preferences or user interactions are generalized (for example, generalized based on user demographics) rather than associated with a particular user.

FIG. 1 depicts an example system architecture 100 that can be used in accordance with implementations of the present disclosure. The example system architecture 100 includes a computing device 102 associated with a user 104, a network 110, a computing system 112 and a computing system 114. The computing device 102, the computing system 112 and the computing system 114 can communicate with each other through the network 110. The computing systems 112, 114 can include a computing device 116 (e.g., a server) and one or more computer-readable storage devices 118 (e.g., a database).

The computing device 102 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. The computing devices 102, 116 may be provided access to and/or receive application software executed and/or stored on any of the other computing devices 102, 116. The computing device 116 can represent various forms of servers including, but not limited to a web server, an application server, a proxy server, a network server, or a server farm. For example, the computing device 116 can be an application server that executes software provided by software vendor entity 102.

In some implementations, the computing devices may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some implementations, the system architecture 100 can be a distributed client/server system that spans one or more networks such as network 110. The network 110 can be a large computer network, such as a local area network (LAN), wide area network (WAN), the Internet, a cellular network, or a combination thereof connecting any number of mobile clients, fixed clients, and servers. In some implementations, each client (e.g., computing device 102) can communicate with servers (e.g., computing devices 116) via a virtual private network (VPN), Secure Shell (SSH) tunnel, or other secure network connection. In some implementations, the networks 110 may include a corporate network (e.g., intranet) and one or more wireless access points.

Figure 2:
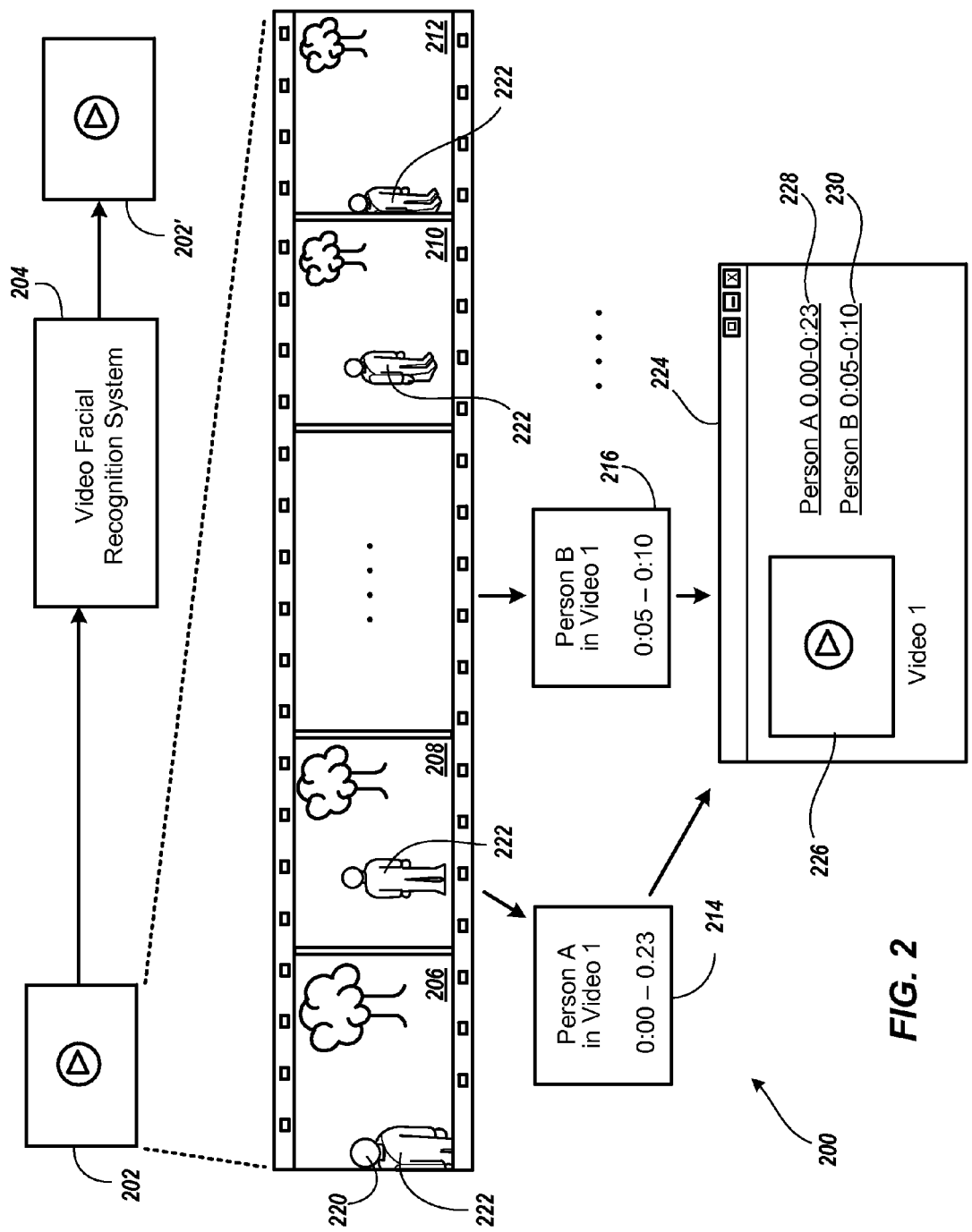
FIG. 2 depicts an example environment for facial detection, recognition and bookmarking in videos.

FIG. 2 depicts an example environment 200 for facial recognition and bookmarking in videos. The example environment 200 includes a video processing system 204 that can receive a digital video file 202 corresponding to a digital video recorded, or otherwise authored by a user. The video processing system 204 processes the digital video file 202, as discussed herein, to provide an annotated video file 202'. In some implementations, the video processing system 204 can be implemented as one or more applications executed using one or more computing devices (e.g., the computing devices 102 and/or 116 of FIG. 1). For example, the video processing system 204 can be implemented using the computing system 114.

The video processing system 204 processes one or more frames of the video, provided as data in the video file 202, as a series of images 206, 208, 210, 212. Each image is processed using face detection techniques, discussed in further detail herein, to detect the presence of one or more faces in the image. In some implementations, each image can be modeled as a vector of image feature data, which can be processed for characteristics such as facial features, skin color, and skin texture. Each face detected in each image can be compared with faces detected in the other images to determine whether the faces are of the same person. Based on the detected faces, the video processing system 204 can determine when a particular face, and thus a particular person, enters or first appears in the video, as well as when the particular person exits, or is no longer present in the video. The video processing system 204 can generate bookmarks corresponding to when each detected face enters and/or exits the video, as discussed in further detail herein.

With continued reference to FIG. 2, a first frame 206 of the video can be provided as an image. The frame 206 can be processed using facial detection techniques to detect the presence of a face 220 of a person 222 appearing in the video 202. A timestamp corresponding to the frame 206 can be stored, or otherwise indicated as a first time, at which the person 222 appears in the video. An example timestamp can be provided in terms of time (e.g., [hours]:[minutes]:[seconds]:[tenths of seconds]) and/or in terms of frame count (e.g., frame #1). For example, if the person 222 appears in the first frame 206 of the video, the timestamp "0:00:00:00" can be stored with an identifier corresponding to the person 222. As another example, if the person 222 appears in the first frame 206 of the video 202, the timestamp "Frame #1" can be stored with the identifier corresponding to the person 222. An example identifier can include "Person A." In some implementations different timestamp markers or metrics and/or identifiers can be used. The timestamp data can be encoded in various ways on the video, using different timecode or timestamp variations. The timestamp data corresponding to the first frame can be determined using the timestamp on the video directly, or the timestamp can be translated to a different format, such as minutes and seconds.

All frames or a subset of frames of the video can be processed to detect the presence of a face in each frame. Each detected face can be processed to determine whether the face corresponds to a face detected in one or more other frames of the video. For example, the face 220 detected in the frame 206 can be identified as being the same face as the face detected in frame 208, and thus corresponding to the same person 222. The timestamp and identifier information of each person can be added to the video file 202 to provide the annotated video file 202', and can be displayed as one or more annotations or bookmarks to the video.

In processing the frames, it can be recognized when a person remains in the video although their face may become obscured or otherwise is not directly visible within a portion of the video. For example, the face 220 of the person 222 can be seen in the frame 206. However, in frame 208, the person 222 has turned away from the camera recording the video and the face 220 cannot be seen. Consequently, although a face may no longer be detected in a particular frame, a person may still be present in the video. Accordingly, adjacent frames (e.g., the frames 206, 208) can be processed to recognize that although a face (e.g., the face 220) is not detected in a particular frame, the person (e.g., the person 222) is still present in the video. In some implementations, upon detection of a face in a first frame, other features (e.g., human anatomical features, clothing style, clothing color, skin tone, hair style, hair color) of a person corresponding to the face can be detected. A second frame can be processed to determine whether the face is also detected in the second frame. If the face is not detected in the second frame, the second frame can be further processed to determine whether one or more of the other features are detected in the second frame. If the one or more other features are detected in the second frame, the person is deemed to still be present in the video, although the face is not detected. If the one or more other features are not detected in the second frame, the person is deemed to no longer be present in the video.

In some implementations, for each person detected, the frame numbers of when the particular person enters and/or exits the video are stored as metadata. Any frames between a timestamp indicating the particular person's first appearance, or entrance in the video and a timestamp indicating the particular person's last appearance, or exit from the video are indicated as including the particular person. In some instances, a person can exit the video and re-enter the video at a later point in time. Consequently, a second set of timestamps can be provided for the particular person.

With continued reference to FIG. 2, an identifier "Person A" can be generated and can correspond to the person 222 whose face 220 is detected in frames 206 through frame 212 of the video. A timestamp set can be generated and can be associated with the identifier "Person A." For example, a first timestamp can be generated for or identified from the frame 206. Because the frame 206 is the first frame of the video, an example first timestamp can include "0:00:00:00." A second timestamp can be generated for or identified from the frame 212. The example video can have an example length, or duration of 23 minutes and 6 seconds. Because the frame 212 is the last frame of the video, the second timestamp can include "0:23:06:00." The timestamp set and the identifier can be provided as bookmark data 214. The bookmark data 214 indicates that Person A is in the video from the beginning of the video and until the end of the video (i.e., 23 minutes and 6 seconds into the video). The information correlating Person A to the times "0:00:00-0:23:06" can be stored and annotated to the video file as the bookmark data 214. The bookmark data 214 can be displayed to a viewer that is viewing the published video.

The video file 202 can be processed to detect the presence of multiple, different persons in the video. For example, the video can include another person and can assign the identifier "Person B" to that particular person. For example, the person identified as "Person B" can appear in one or more frames that are between the frame 208 and the frame 210. A timestamp set can be generated and can include the timestamps of when Person B entered and exited the video. Example timestamps can include "0:05:00:00" and "0:10:00:00." The timestamp set and the identifier can be provided as bookmark data 216. The bookmark data 216 indicates that Person B is in the video from 5 minutes into the video and until 10 minutes into the video. The information correlating Person B to the times "0:05:00-0:10:00" can be stored and annotated to the video file as the bookmark 216. The bookmark data 216 can be displayed to a viewer that is viewing the published video.

The annotated video file 202' can be provided for publication to a viewing audience. For example, the video processing system 204 can provide the annotated video file 202' directly to a publishing service for publishing the video based on instructions provided by the author of the video. As another example, the video processing system 204 can provide the annotated video file back 202' back to the author to enable the author 202' to publish the video themself.

In some implementations, the annotated video can be published to a webpage 222. The webpage 222 can include a video 224 and bookmarks 226, 228 based on data provided in the annotated video file 202'. The bookmarks 226, 228 respectively correspond to the bookmark data 214, 216. In some implementations, the bookmarks 226, 228 can be displayed as user-selectable links adjacent to the video 224. By clicking on a bookmark 226, 228, a viewer can jump to a time in the video 224, at which the person corresponding to the selected bookmark 226, 228 appears. In this manner, a user viewing the video 224 can skip directly to where the bookmarked person appears in the video 224. In some implementations, the bookmarks 226, 228 can link to a screenshot, or the frame of the video 224 showing the frame in which the corresponding person first appears. The screenshot can include an indicator designating where the person is seen in the frame. For example, a box or other annotator can be drawn around the bookmarked person. The indicator can also be included in the video, so that each person can be recognized while the video is playing. For example, a box or an annotation including the identifier of the person or other indicator can appear when a user positions a cursor over a person in the video.

A detected face can be recognized as a face belonging to a particular person, and corresponding identity data can be appended to the annotated video file 202'. For example, the detected face 220 underlying the anonymous identity "Person A," can be recognized as belonging to a particular person, Davis Morgan. Once recognized, the identifier "Person A" can be substituted with "Davis Morgan."

In some implementations, a face detected in the video can be recognized based on input provided by the author of the video and/or a viewer of the video. For example, the video processing system 204 can prompt the author to provide input identifying "Person A" and/or "Person B." If the author is unable to identify either "Person A" or "Person B," the video processing system 204 can maintain the identifiers "Person A" or "Person B." If the author is able to identify "Person A" or "Person B," the video processing system 204 can receive identity information as input from the author and can modify the identifiers accordingly (e.g., the identifier "Person A" can be substituted with "Davis Morgan"). In the case of a viewer of the video, the viewer can provide input as to the identity of a person corresponding to an identifier. For example, a viewer of the video 224 may recognize the person identified as "Person A" as being a particular person, Davis Morgan. The viewer can provide input indicating that "Person A" is David Morgan, and the identifier "Person A" can be substituted with "Davis Morgan."

In some implementations, identity data provided by the author and/or viewer can include profile information corresponding to a profile of the recognized person in a social networking service. For example, when the video processing system 204 receives identity data indicating that "Person A" is David Morgan, the identifier "Person A" can be substituted with "Davis Morgan" and a link can be provided linking the identifier to a profile of Davis Morgan within a particular social networking service. Consequently, when a viewer of the video clicks on the link, a profile page corresponding to Davis Morgan can be displayed to the viewer.

In some implementations, the video processing system 204 automatically recognizes faces detected within the video. For example, a facial model for each face detected in the video is generated and can be compared to facial models corresponding to known identities. A facial model can include a collection of facial templates corresponding to a detected face. Each frame, treated as a digital image, including the detected face can be processed to provide a facial template. For example, the frames 206-210 can each be processed to generate a plurality of facial templates. Each template can include a different environment or condition of the detected face. For example, a first facial template can show the detected face under a first lighting condition, at a first angle, and with a first expression, while a second facial template can show the detected face under a second lighting condition, at a second angle, and/or with a second expression. Each facial template can include one or more feature vectors about the detected face, which feature vectors can be rotated and normalized. The facial model include all of the facial templates provided by each of the images processed in the video where the particular face was detected.

Each facial model is compared to known facial models. If there is a sufficient correspondence between a facial model and a known facial model, as discussed in further detail herein, the facial model can be identified as being of the same person as the known facial model. Known facial models can include facial models that have been created, stored and are accessible by the video processing system 204. Known facial models can include facial models corresponding to public figures such as celebrities, politicians, athletes and other publicly known people. For example, facial models corresponding to public figures can be generated based on publicly available images, each image being used to generate a facial template.

Known facial models can include facial models corresponding to non-public figures. In some implementations, a database of known facial models corresponding to non-public figures can store previously generated facial models. The facial models can be generated based on images including known persons. For example, a user "Bob" of a social networking service may upload and publish images using the social networking service, and may "tag" himself, or otherwise indicate his presence in the images. Such published images can be processed to generate a facial model corresponding to Bob.

In some implementations, the facial models stored in a database can be periodically updated to improve the quality thereof. For example, facial templates making up a particular facial model can be replaced with better quality facial templates to improve the overall quality of the facial model. In some implementations, better new facial templates can be provided from videos and/or images that include a particular person. Using the example above, the user Bob can upload and publish images using the social networking service, and may "tag" himself, or otherwise indicate his presence in the images. The so-provided images can be processed to generate one or more facial templates, which facial templates can be used to update an already-stored facial model corresponding to Bob.

In some implementations, known facial models can be generated on-the-fly. That is, instead of, or in addition to providing a database of previously generated known facial models, known facial models can be generated for facial recognition purposes described herein, and can be subsequently deleted, or otherwise not persistently stored. For example, the video processing system 204 can issue a request for known facial models. In response to the request, one or more facial models corresponding to a known identity can be generated and used for comparison purposes, as discussed herein. For example, published images corresponding to the user Bob can be accessed and processed and a facial model for Bob can be generated. The facial model can be used for comparison purposes and can be subsequently deleted. In some examples, one or more facial models can be generated on-demand. Continuing with the example above, respective facial models can be generated on-demand for Bob, each of Bob's contacts. Facial models generated from the video can be compared to the set of on-demand generated facial models.

In some implementations, known facial models can correspond to people that are users of a social networking service, and that are contacts of the author of the video within the social networking service. In some implementations, a social networking service provides the video processing system 203. The author of a video that is uploaded for publication to the social networking service can be socially connected to other users of the social networking service. Such social connections are described in further detail below with reference to FIG. 5. Facial models for each of the author's social connections within the social networking service can be generated based on any images or other information available (e.g., images, videos). Using the example above, the user "Bob" can be socially connected to the author of the video. Consequently, a facial model corresponding to Bob can be generated and can be compared to one or more facial models of the video for facial recognition. In some implementations, and as discussed above, users of the social networking service can have privacy settings that allow or prevent facial models from being generated and/or used for facial recognition.

In some implementations, known facial models can correspond to people that are users of a social networking service, and that are indirectly associated with the author of the video within the social networking service. For example, the user Bob may be a direct contact of the author of the video. Another user, Claire, can be a direct contact of the user Bob within the social networking service, but is not a direct contact of the author of the video. As discussed above, a facial model corresponding to Bob can be generated and can be compared to one or more facial models of the video for facial recognition. Additionally, and because Claire is a direct contact of Bob, a facial model corresponding to Claire can be generated and can be compared to one or more facial models of the video for facial recognition.

A facial model generated based on a video file (video facial model) can be compared to one or more known facial models to determine an identity of a person appearing in the video. In particular, the facial templates of a video facial model are compared to facial templates of each of one or more of a plurality of known facial models. For example, a video facial model corresponding to a person appearing in a video can include N facial templates. A known facial model corresponding to a person whose identity is known can include M facial templates. Comparing the facial models can include an N×M, pairwise comparison, each of the N facial templates being compared to each of the M facial templates one at a time or simultaneously. A similarity score corresponding to the similarity between two facial templates can be generated, to provide a plurality of similarity scores. Each similarity score can be based on factors such as skin color and tone, relative distances between facial features, sizes of facial features, and other biometric information that is provided in the facial models. The facial templates can be normalized for size and/or color (e.g., differences in light color, amount of light, black and white images), or dynamically adjusted for each comparison.

The similarity scores for each facial model comparison can be combined to generate a confidence score that the two facial models correspond to the same person. The similarity scores can be combined in a variety of ways to generate the confidence score. For example, the similarity scores can be aggregated or averaged. Alternatively or in addition, particular facial templates can be weighted to influence the confidence score more than other facial templates. In some implementations, the confidence score can be a function of the maximum similarity score or a function similar to a maximum function of the similarity scores. A plurality of confidence scores can be provided, each confidence score corresponding to a comparison between a video facial model and a known facial model of the plurality of known facial models.

In some implementations, the comparison having the highest confidence score can be used to determine the identity of the person corresponding to the video facial model. In some implementations, each confidence score can be compared to a threshold confidence score. If a confidence score exceeds a threshold confidence score, the corresponding comparison can be a candidate comparison for determining the identity of the person corresponding to the video facial model. For example, a video facial model can be compared to a facial model corresponding to the user Bob to provide a first confidence score. The video facial model can also be compared to a facial model corresponding to the user Claire to provide a second confidence score. If the first confidence score and the second confidence score are both below the threshold confidence score, the video facial model can be deemed to correspond to neither Bob nor Claire. If the first confidence score is greater than the threshold confidence score, and the second confidence score is below the threshold confidence score, the video facial model can be deemed to correspond to Bob. If the second confidence score is greater than the threshold confidence score, and the first confidence score is below the threshold confidence score, the video facial model can be deemed to correspond to Claire. If the first confidence score and the second confidence score are both greater than the threshold confidence score, the video facial model can be deemed to correspond to at least one of Bob and Claire. In such a case, the highest confidence score can be selected. For example, if both the first and second confidence score are greater than the threshold confidence score, and the first confidence score is greater than the second confidence score, the video facial model can be deemed to correspond to Bob. As another example, if both the first and second confidence score are greater than the threshold confidence score, and the second confidence score is greater than the first confidence score, the video facial model can be deemed to correspond to Claire.

In some implementations, two or more confidence scores of a plurality of confidence scores can be greater than the threshold confidence score, but can be sufficiently similar in value as to make a definitive identification based on only one confidence score difficult. Using the examples above, if both the first and second confidence score are greater than the threshold confidence score, but a difference between the first confidence score and the second confidence score is less than a threshold difference, the video facial model cannot definitively be deemed to correspond to Bob over Claire, or Claire over Bob. Consequently, a request can be generated and can be provided to one or more of the author of the video, Bob and Claire. The request can request that the author of the video, Bob and/or Claire provide input indicating, to which particular person the detected face corresponds. User input can be generated by at least one or more of the author of the video, Bob and Claire, and can be used to definitively identify the detected face as belonging to Bob or Claire. For example, a request can be sent to Bob. In response to the request, Bob provides user input indicating that the face detected in the video is indeed his face. Consequently, the detected face can be identified as belonging to Bob.

The video processing system 204 can generate identity data based on comparing the video facial models to the one or more known facial models and can modify the identifiers accordingly. For example, if the video facial model is deemed to be sufficiently equivalent to the known facial model corresponding to Claire, identity data corresponding to Claire can be generated and the corresponding identifier can be updated (e.g., the identifier "Person A" can be substituted with "Claire"). The identity data can be provided in the annotated video file 202'. Consequently, subsequent publication of the annotated video file 202' will include the bookmarks, discussed above, as well as identity information corresponding to persons detected in the video. As discussed above, the identity data can include profile information corresponding to a profile of the recognized person in a social networking service.

Figure 3:
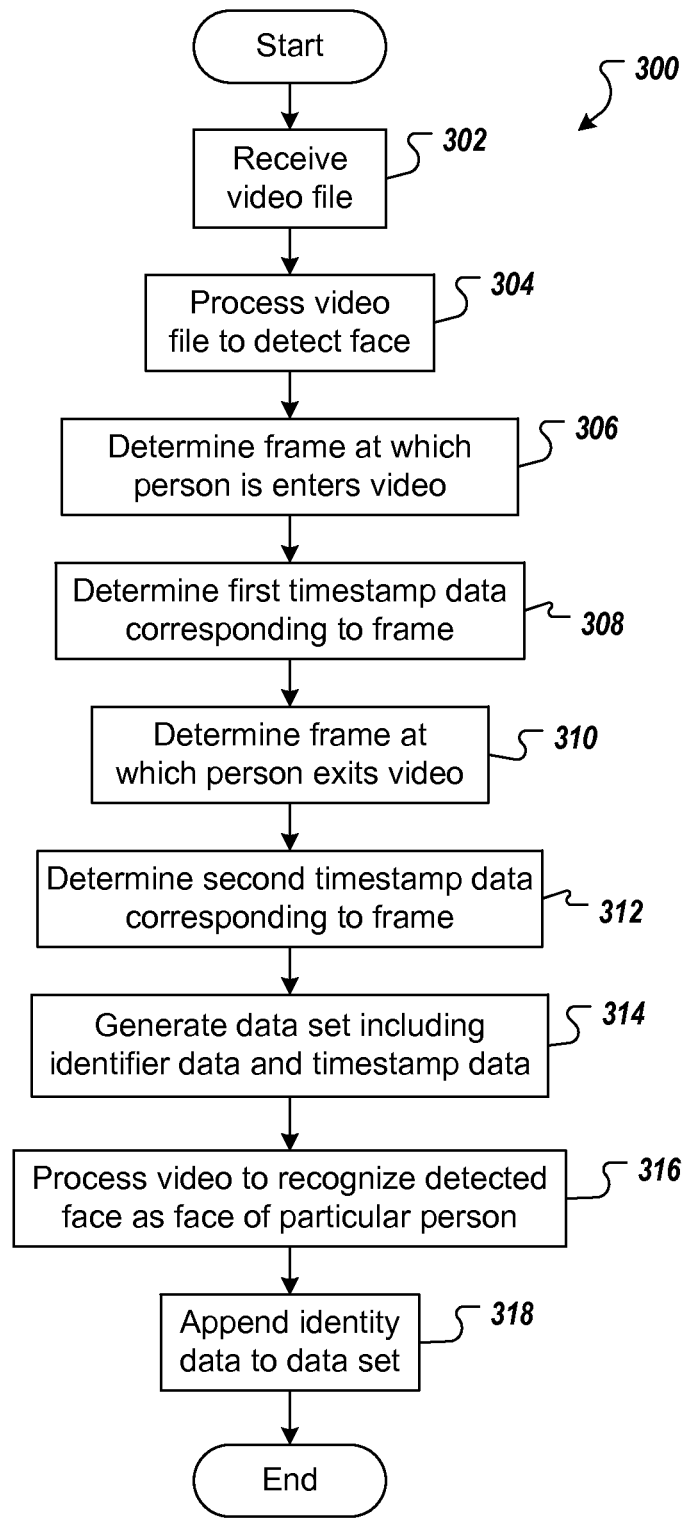
FIG. 3 is a flowchart of an example process for facial detection and bookmarking in videos.

FIG. 3 is a flowchart of an example process 300 for facial detection and bookmarking in videos. In some implementations, actions represented in the example process 300 may be performed using one or more computing devices (e.g., the computing devices 102 and/or 116 of FIG. 1). For example, the example process 300 can be implemented using the computing system 114 of FIG. 1.

A video file is received (302). The video file can correspond to a digital video uploaded by a user over the network. For example, the video file can be uploaded by the user 104 using the computing device 102 and can be received by the computing system 114. The user can upload the video file for publication using a social networking service or a website for sharing video content. The video file is processed to detect one or more human faces (304). As discussed, all frames or a subset of frames can be processed as separate images using facial detection techniques. For example, the video processing system 204 of FIG. 2 can process the video file.

A frame at which a particular face, and consequently, a particular person enters, or first appears in the video is determined (306). First timestamp data corresponding to the frame is determined (308). A frame at which the particular face, and consequently, the particular person exits the video is determined (310). Second timestamp data corresponding to the frame is determined (312). A data set including identifier data and the first and second timestamp data is generated (314). The identifier data can include an anonymous identifier (e.g., Person A). The data set can be appended to the video file to generate an annotated video file, as discussed herein. An optional step can include processing the video file to recognize the detected face as belonging to a particular person (316). An example process for recognizing people in videos is described in further detail below with reference to FIG. 4. Identity data corresponding to the particular person recognized is appended to the data set (318).

Figure 4:
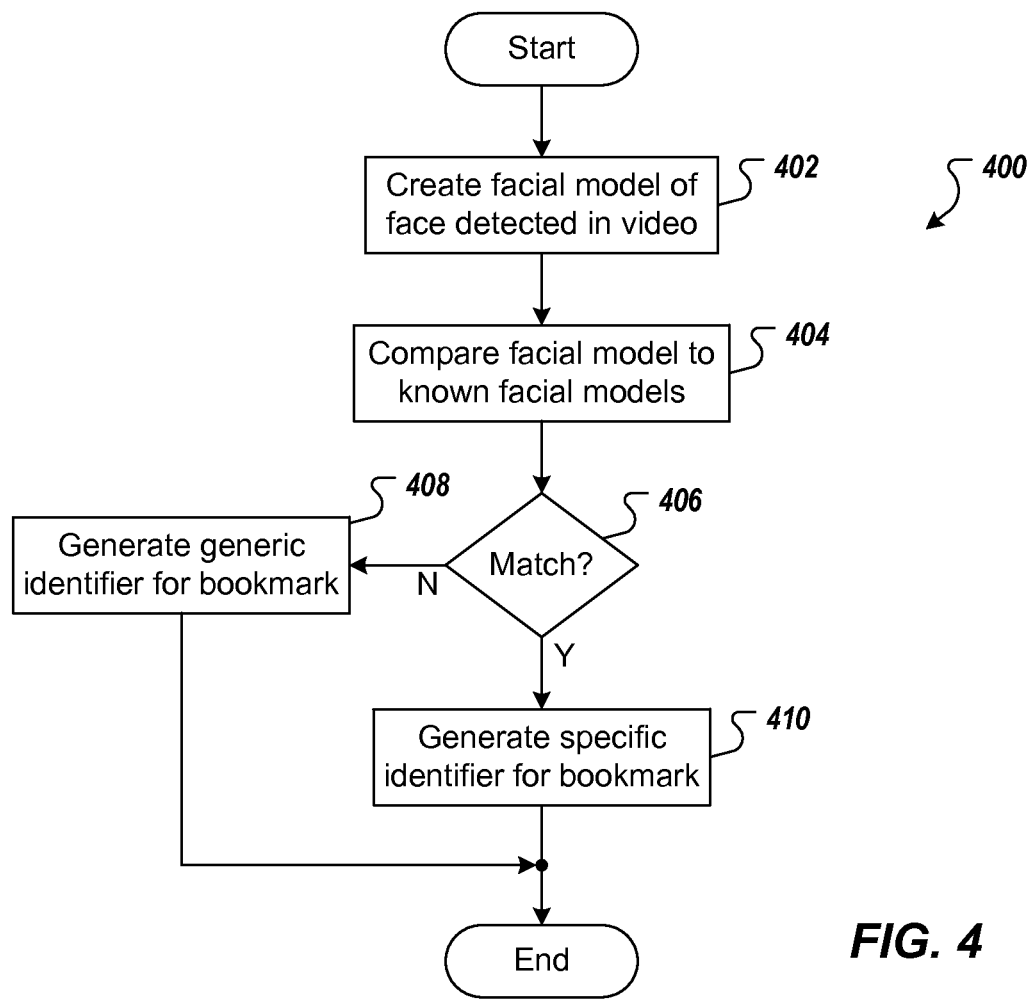
FIG. 4 is a flowchart of an example process for facial recognition in videos.

FIG. 4 is a flowchart of an example process 400 for facial recognition in videos. In some implementations, actions represented in the process 400 may be performed by a system such as the computer system 114 of FIG. 1. In some implementations, actions represented in the process 400 can be performed as sub-actions of actions represented in the process 300 of FIG. 3.

In the example process 400, a facial model corresponding to a face detected in a video is created (402). For example, and as discussed above, a plurality of frames can be processed using the video processing system 204 of FIG. 2 to generate a plurality of facial templates, the facial model including the plurality of facial templates. The facial model is compared to known facial models (404).

In some implementations, the facial model can be compared to publicly available and accessible facial models that are persistently stored in a computer-readable storage device. For example, the video processing system 204 of FIG. 2 can access publicly available facial models from a database over a network. In some implementations, and as discussed in further detail above, one or more known facial models can be generated on-the-fly for purposes of facial recognition and can be subsequently deleted, such that they are not persistently stored. For example, the video processing system 204 of FIG. 2 can access publicly available images and/or videos corresponding to known individuals and can process the images and/or videos to generate a temporary facial model for comparison purposes. After use of the temporary facial model, the temporary facial model can be deleted from memory. In some implementations, and as discussed above, the known facial models can correspond to one or more direct contacts and/or one or more indirect contacts of the author of the video within a social networking service.

It is determined whether the facial model matches a known facial model (406). For example, and as discussed in detail above, a plurality of confidence scores can be generated, each confidence score corresponding to a comparison between the facial model and a known facial model of a plurality of known facial models. A match between the facial model and a known facial model can be determined based on the confidence scores, as discussed in detail above. For example, the video processing system 204 of FIG. 2 can determine whether the facial model matches a known facial model based on a corresponding confidence score.

If the facial model does not match a known facial model, a generic identifier is provided for a bookmark (408). For example, the video processing system 204 of FIG. 2 can determine that the facial model does not match a known facial model and can generate a generic identifier (e.g., Person A, Person B) for one or more corresponding bookmarks (e.g., the bookmarks 228, 230). If the facial model matches a known facial model, a specific identifier is provided for a bookmark (410). For example, the video processing system 204 of FIG. 2 can determine that the facial model matches a known facial model and can generate a specific identifier (e.g., Bob, Claire) for one or more corresponding bookmarks (e.g., the bookmarks 228, 230). The specific identifier can be generated based on identity data that corresponds to the matching known facial model.

Figure 5:
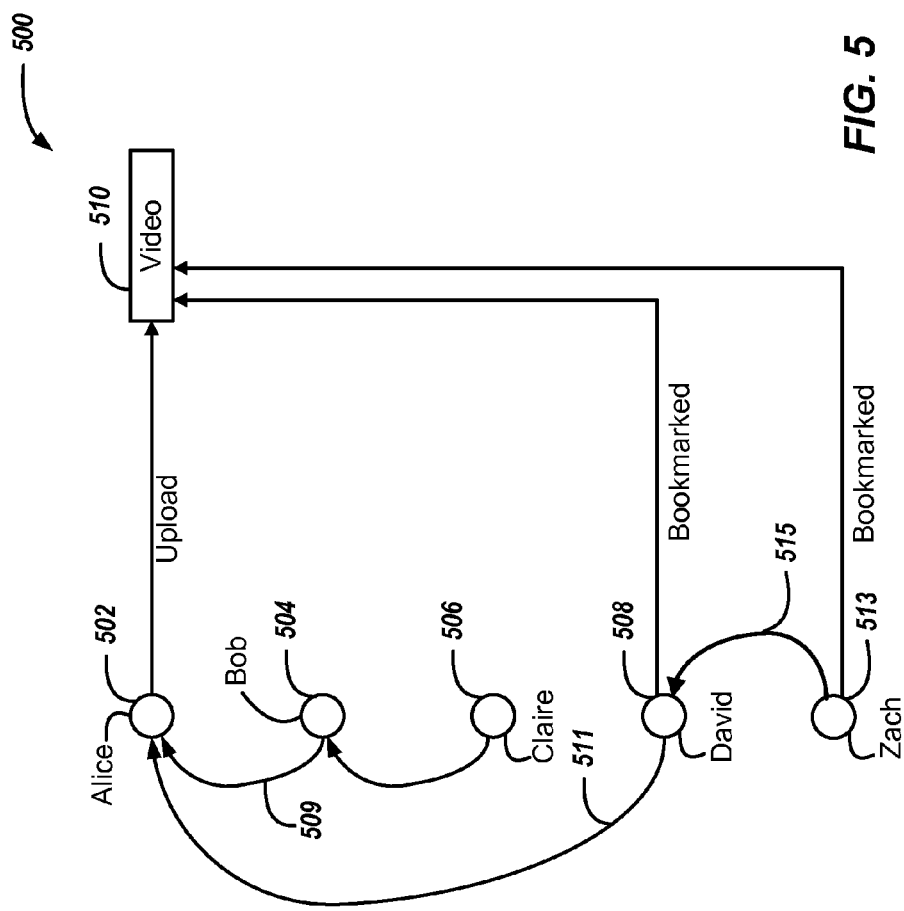
FIG. 5 depicts an example social graph.

FIG. 5 depicts an example social graph 500. The example social graph 500 corresponds to a user ("Alice") identified using a node 502. The social graph 500 can be determined based on Alice's use of a computer-implemented social networking service. For example, Alice can generate a profile within the social networking service and can digitally associate the profile with profiles of other users of the social networking service. Alice can upload videos that can be published using the social networking service. In the example social graph 500 of FIG. 5, other users of the social networking service include user ("Bob") identified by a node 504, user ("Claire") identified by a node 506, user ("David") identified by a node 508, and user ("Zach") identified by a node 513. Bob and David are both contacts of Alice within the social networking service, as indicated by edges 509, 511. For example, Alice previously approved Bob and David as contacts in the social networking service, such that information and/or videos provided or uploaded by Alice may be automatically shared with Bob and David.

In the example social graph 500 of FIG. 5, Claire is not a contact of Alice within the social networking service. Instead, Claire may be another user of the social networking service that has limited access to the information and/or posts provided by Alice. For example, Claire is a contact of Bob within the social networking service. Consequently, Claire may be able to access information published by Alice, depending on privacy settings established by Alice, through Bob. Zach is a contact of David, as indicated by the edge 515, but is not a contact of Alice.

In the example social graph of FIG. 5, Alice uploads a video 510 for publication using the social networking service. The video 510 can be processed to detect faces and to recognize detected faces based on Alice's contacts within the social networking service, as discussed herein. In the example of FIG. 5, both David and Zach are illustrated as having been recognized in the video 510. In some implementations, the video 510 may include a privacy setting, set by Alice as the one who uploaded the video, that enables any user of the social networking service to view and comment on the video 510. In this manner, both Bob, who is a contact of Alice, and Claire, who is not a contact of Alice, may be able to view and comment on the video 510. In some implementations, Alice is able to establish a privacy setting of a video such that only contacts of Alice within the social networking service, or a subset of contacts of Alice within the social networking service are able to view and comment on the video.

David can be recognized in the video 510 by comparing facial models of faces detected in the video to facial models of Alice's contacts within the social networking service. Consequently, facial models of Bob and David can be compared to facial models corresponding to the faces detected in the video 510, and it can be determined that David matched with a person detected in the video 510 with enough confidence to provide a bookmark for David in the video 510. Zach can be recognized in the video 510 by comparing facial models of David's contacts, as David has been determined to be in the video 510.

In some implementations, a user's privacy setting within the social networking service may be set by the user to opt into or opt out of be recognized within a video that is published using the social networking service. For example, although Zach could be recognized in the video 510 uploaded by Alice, Zach's privacy settings can be set such that facial recognition is not allowed using images and/or videos corresponding to Zach. Consequently, a bookmark including identity information corresponding to Zach is not generated. Alternatively, an anonymous bookmark having a generic identifier (e.g., Person A, Person B) can be generated to indicate that a face has been detected (e.g., Zach's face), but not providing any identity information.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system comprising:
a data processing apparatus; and
a computer storage medium encoded with a computer program, the program comprising instructions that when executed by the data processing apparatus cause the data processing apparatus to perform operations comprising:
receiving a digital video comprising video data;
processing the video data to detect features indicative of a human face in the digital video;
determining, from the video data, a first frame, in which the features indicative of the human face are detected in the digital video;
determining first timestamp data corresponding to the first frame;
determining, from the video data, a second frame, in which the features indicative of the human face are detected in the digital video;
determining second timestamp data corresponding to the second frame;
generating an identifier corresponding to the human face;
generating a data set comprising the identifier, the first timestamp data, and the second timestamp data;
appending the data set to the video data to provide annotated video data; and
displaying an indicator that indicates a location of the human face in the digital video while the digital video is playing, wherein the indicator is an annotation associated with the human face, and wherein the indicator includes the identifier of the human face.

2. The system of claim 1, wherein the first timestamp data indicates a first appearance of the human face in the digital video, and wherein the second timestamp data indicates a last appearance of the human face in the digital video.

3. The system of claim 1, wherein the program further includes instructions that cause the data processing apparatus to perform operations comprising:
generating a bookmark; and
storing the first timestamp data and the second timestamp data in the bookmark.

4. The system of claim 1, wherein the program further includes instructions that cause the data processing apparatus to perform operations comprising displaying an annotated video based on the annotated video data, the annotated video comprising a bookmark corresponding to the data set.

5. The system of claim 4, wherein the program further includes instructions that cause the data processing apparatus to perform operations comprising:
receiving user input based on the bookmark; and
advancing a presented frame in the digital video to the first frame in response to the user input.

6. The system of claim 1, wherein the program further includes instructions that cause the data processing apparatus to perform operations comprising:
comparing a first position of the features indicative of the human face in the first frame to a second position of features indicative of a second human face in the second frame; and
determining, based on the first position and the second position, that the features indicative of the second human face correspond to the features indicative of the human face.

7. The system of claim 1, wherein the program further includes instructions that cause the data processing apparatus to perform operations comprising:
generating a facial model of the human face; and
comparing the facial model to known facial models.

8. The system of claim 7, wherein generating the facial model of the human face comprises generating a plurality of facial templates, each facial template corresponding to a frame in the video data in which the human face is detected, the facial model comprising the plurality of facial templates.

9. The system of claim 7, wherein each of the known facial models corresponds to a user of a social networking service.

10. The system of claim 7, wherein the program further includes instructions that cause the data processing apparatus to perform operations comprising updating a known facial model based on one or more of a plurality of facial templates of the facial model.

11. The system of claim 7, wherein the known facial models are each generated after receiving the digital video.

12. The system of claim 7, wherein the known facial models are deleted from computer-readable memory after comparing.

13. The system of claim 7, wherein the known facial models are accessed from a persistent storage device that electronically stores a database of known facial models.

14. The system of claim 7, wherein comparing the facial models comprises comparing each facial template of the facial model to facial templates of each of the known facial models.

15. The system of claim 7, wherein the program further includes instructions that cause the data processing apparatus to perform operations comprising:
    generating a confidence score between the facial model and a known facial model based on comparing the facial model to known facial models;
    comparing the confidence score to a threshold confidence score; and
    indicating that the facial model corresponds to the known facial model when the confidence score is greater than the threshold confidence score.

16. The system of claim 7, wherein the program further includes instructions that cause the data processing apparatus to perform operations comprising:
    determining identity data corresponding to the known facial model;
    associating the facial model with the identity data; and
    appending the identity data to the data set.

17. The system of claim 16, wherein the program further includes instructions that cause the data processing apparatus to perform operations comprising storing the facial model as a known facial model.

18. The system of claim 1, wherein the program further includes instructions that cause the data processing apparatus to perform operations comprising receiving user input, the user input indicating an identity associated with the human face, and wherein the identifier corresponds to the identity.

19. A non-transitory computer-readable medium coupled to one or more processors having instructions stored thereon which, when executed by the one or more processors, cause the one or more processors to perform operations comprising:
    receiving a digital video comprising video data;
    processing the video data to detect features indicative of a human face in the digital video;
    determining, from the video data, a first frame, in which the features indicative of the human face are detected in the digital video;
    determining first timestamp data corresponding to the first frame;
    determining, from the video data, a second frame, in which the features indicative of the human face are detected in the digital video;
    determining second timestamp data corresponding to the second frame;
    generating an identifier corresponding to the human face;
    generating a data set comprising the identifier, the first timestamp data and the second timestamp data;
    appending the data set to the video data to provide annotated video data; and
    displaying an indicator that indicates a location of the human face in the digital video while the digital video is playing, wherein the indicator is an annotation associated with the human face, and wherein the indicator includes the identifier of the human face.

20. A computer-implemented method comprising:
    receiving a digital video comprising video data;
    processing the video data to detect features indicative of a human face in the digital video;
    determining, from the video data, a first frame, in which the features indicative of the human face are detected in the digital video;
    determining first timestamp data corresponding to the first frame;
    determining, from the video data, a second frame, in which the features indicative of the human face are detected in the digital video;
    determining second timestamp data corresponding to the second frame;
    generating an identifier corresponding to the human face;
    generating a data set comprising the identifier, the first timestamp data and the second timestamp data;
    appending the data set to the video data to provide annotated video data; and
    displaying an indicator that indicates a location of the human face in the digital video while the digital video is playing, wherein the indicator is an annotation associated with the human face, and wherein the indicator includes an identifier of the human face.

* * * * *